(12) United States Patent
Wilkinson

(10) Patent No.: US 6,489,921 B1
(45) Date of Patent: Dec. 3, 2002

(54) VEHICLE LOCATING APPARATUS

(76) Inventor: Jeffrey Fergus Wilkinson, 1280 Olive Dr. #136, Davis, CA (US) 95616

(*) Notice: Subject to any disclaimer, the term of this patent is extended or adjusted under 35 U.S.C. 154(b) by 0 days.

(21) Appl. No.: 09/903,109

(22) Filed: Jul. 12, 2001

(51) Int. Cl.[7] .......................... H04B 7/185; G01S 3/02
(52) U.S. Cl. .................................. 342/357.08; 342/457
(58) Field of Search ........................ 342/357.08, 457, 342/443

(56) References Cited

U.S. PATENT DOCUMENTS

| | | | |
|---|---|---|---|
| 5,606,325 A | 2/1997 | Masudaya | |
| 6,239,701 B1 | 5/2001 | Vasquez | |
| 6,246,314 B1 | 6/2001 | Djaid | |
| 6,363,324 B1 * | 3/2002 | Hildebrant | 342/357.08 |

* cited by examiner

*Primary Examiner*—Thomas H. Tarcza
*Assistant Examiner*—Fred H Mull (57) ABSTRACT

Herein is disclosed a system for locating a parked vehicle, as in the case of a driver having forgotten the location of his/her parked vehicle in a crowded parking lot, whereby a handheld apparatus is automatically engaged prior to the driver leaving the immediate vicinity of his/her parked vehicle. When thusly engaged, the apparatus retrieves GPS location coordinates for the parked vehicle from GPS satellites and stores these coordinates in its memory. Once activated by the driver for the purpose of finding his/her parked vehicle, the Vehicle Locating Apparatus retrieves GPS location coordinates for the driver's current position. Using the GPS location coordinates stored in its memory and those retrieved for the driver's current location, a microprocessor contained within the apparatus calculates the shortest course between the driver and his/her parked vehicle. This course is then presented on a visual display by way of a "floating" directional arrow.

In the case of a parking garage where GPS satellite signals cannot be retrieved consistently, the apparatus has a built in counting switch that allows the driver to manually record in the apparatus' memory the floor number on which he/she parked his/her vehicle. When requested, the apparatus displays the floor number on a visual display.

29 Claims, 5 Drawing Sheets

FIG. 5

VEHICLE LOCATING APPARATUS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention pertains to the field of vehicle location, and more specifically to the use of satellite technology to aid a driver in finding his/her parked vehicle when the driver has forgotten the location of his/her parked vehicle as in the case of a vehicle parked in a crowded parking lot.

From time to time, most people have had the unpleasant experience of forgetting where they parked their vehicle; those with impaired memory from age or disease are particularly susceptible. Not only is wandering around a parking lot looking for a car unpleasant, it may also be dangerous as most people in this situation are preoccupied and therefore more vulnerable to attack by predatory individuals.

The art of locating vehicles in general has been greatly enhanced with the advent of the Global Positioning System (GPS). With regard to vehicle location, general uses of GPS technology include the recovery of stolen vehicles, vehicle tracking by companies with large fleets of trucks for routing purposes, and various kinds of investigative work. For these purposes, a GPS device onboard the vehicle retrieves GPS signals from at least three orbiting GPS satellites. These GPS signals are converted into location coordinates that are either stored in the GPS device's memory or transmitted to a base station via radio, cellular or paging technology. The base station then determines the vehicle's location by plotting the coordinates on a map either manually or on a computer mapping system. GPS devices used as such are cumbersome, require considerably more technology than the preferred embodiment of this invention, and are not intended for use as a handheld locating device for the objectives as disclosed herein.

Many GPS devices are coming onto the market for the purpose of personal navigation. Although a personal navigation system could be used to find one's vehicle, it would require the driver to manually retrieve GPS location coordinates for the parked vehicle prior to leaving the vehicle's immediate proximity. This is a significant disadvantage, as the driver would have to remember to bring the GPS device on every outing as well as to manually retrieve location coordinates every time the vehicle is parked. Other disadvantages of these devices are that they are expensive and too bulky to fit comfortably into a man's trousers pocket.

For the main purpose of this invention—aiding a driver to find his/her vehicle as in the case of the driver forgetting the location within a crowded parking lot of his/her vehicle—prior art has concentrated mostly on either radio signal directional finders as demonstrated by U.S. Pat. No. 5,606, 325 (1997) and visual and/or audible signaling devices attached to the vehicle and generally triggered remotely by radio signal as demonstrated by U.S. Pat. Nos. 6,246,314 (2001) and 6,239,701 (2001).

With regard to radio signal directional finders developed for the purpose of locating a car in a crowded parking lot, the most significant disadvantages are distorted signals due to obstructions such as surrounding vehicles and or buildings, the reliability of the signal over long distances, and the size and physical nature of the portable devices and their directional antennas. Few people would use a bulky system to avoid the inconvenience of forgetting the location of their parked vehicle.

With regard to signaling devices, it seems obvious that such devices have inherent weaknesses, including difficulty seeing the signaling device from long distances (the greater the distance, the higher the signaling device must be), buildings and other obstructions that could block a visual sighting, the difficulty of determining direction from sound especially for those with hearing impairment and, of course, the embarrassment of calling attention to the fact that you've lost your car.

BRIEF SUMMARY OF THE INVENTION

Accordingly, the main objective of this invention is to aid a driver in finding his/her vehicle as in the case of a vehicle having been parked in a crowded parking lot. The invention, in its preferred embodiment, comprises a small, handheld apparatus that contains a GPS receiver. At the time the vehicle is first parked, the GPS receiver retrieves location coordinates for the parked vehicle without prompting from the driver and stores those location coordinates in the apparatus' memory. At the time the driver activates the apparatus for the purpose of locating his/her vehicle, the GPS receiver retrieves location coordinates for the driver's current location. The present invention, using formulas well known to those skilled in the art, calculates a straight course between the driver and his/her parked vehicle. The course is then presented on the apparatus' visual display as a "floating" directional arrow pointing from the driver's current location toward his/her parked vehicle.

Another object of this invention is to remind a driver on what floor he/she has parked a vehicle within a multi-story parking garage by including in the Vehicle Locating Apparatus a simple electronic counting switch that, when manually depressed by the driver, increases the number stored in the apparatus' memory by one integer until the corresponding floor number is achieved, the floor number being available for display when later requested by the driver.

Another object of the invention is to be smaller and more compact than standard GPS devices used for personal navigation. The preferred embodiment is a device small enough to be attached to a key chain with dimensions similar to a typical key chain automobile alarm activator.

And still another object of this invention is that a driver may use his/her vehicle as a starting point when journeying on foot into unfamiliar territory. This invention, by way of visual display, presents the direction by which the driver may safely return to his/her vehicle without incurring the expense of more elaborate (and bulky) personal navigation systems.

REFERENCE NUMERALS IN DRAWINGS

The first digit in the following reference numerals refers to the figure in which the reference numeral first appears (e.g., 205 first appears in FIG. 2).
100 GPS satellites
101 Parked vehicle
102 Driver of parked vehicle
103 Vehicle Locating Apparatus
104 GPS location coordinates for the parked vehicle
105 GPS location coordinates for the driver's current location
106 Straight course of travel between the driver and his/her parked vehicle
200 Vehicle dashboard
201 Vehicle's ignition
202 RF "tag" transmitter
203 Coded RF signal
204 The apparatus' LCD screen
205 Floating direction arrow
206 Switch for manually retrieving location coordinates for the parked vehicle
207 Toggle switch for manually activating locator
208 Switch for manually inputting and/or displaying the parking garage floor number
209 Parking garage floor reminder display
301 Antenna's for either the RF detector or GPS receiver
302 GPS receiver
303 RF detector which incorporates a filter and amplifier
304 Microprocessor
305 Memory
306 Audible alert
307 Battery
308 Solar cell
400–428 This series of numerical references contains text descriptions in a flowchart format

DETAILED DESCRIPTION OF THE INVENTION

Figure 1:
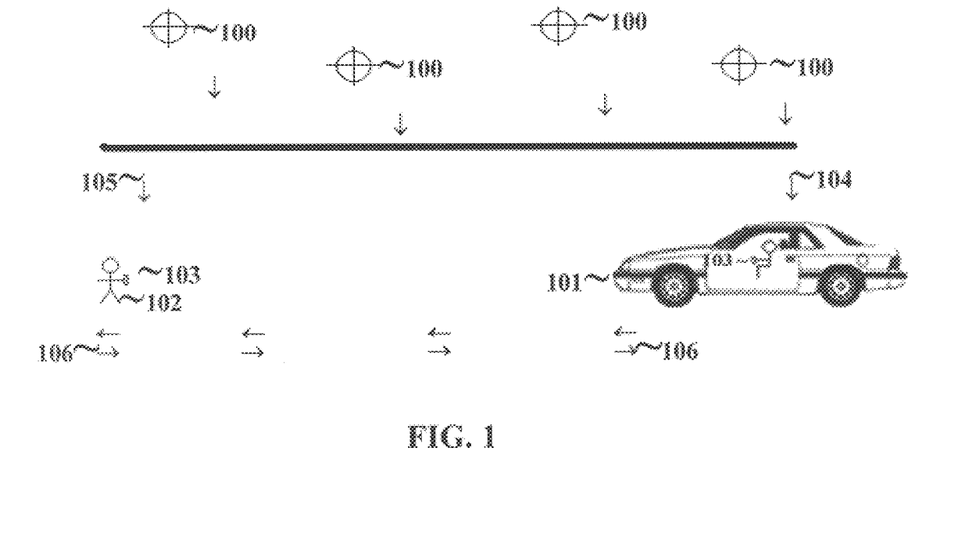
FIG. 1 is a perspective view of the GPS system in accordance with the parameters of this invention.

FIG. 1 illustrates the basic methodology underlying the Vehicle Locating Apparatus (103). Twenty-four GPS satellites (100) orbit the earth, providing signals (104/105) that can be retrieved and converted into location coordinates. GPS satellite signals (104/105) (also referred to herein as GPS location coordinates) from at least three GPS satellites (100) are necessary to establish a location bearing on earth.

Figure 3:
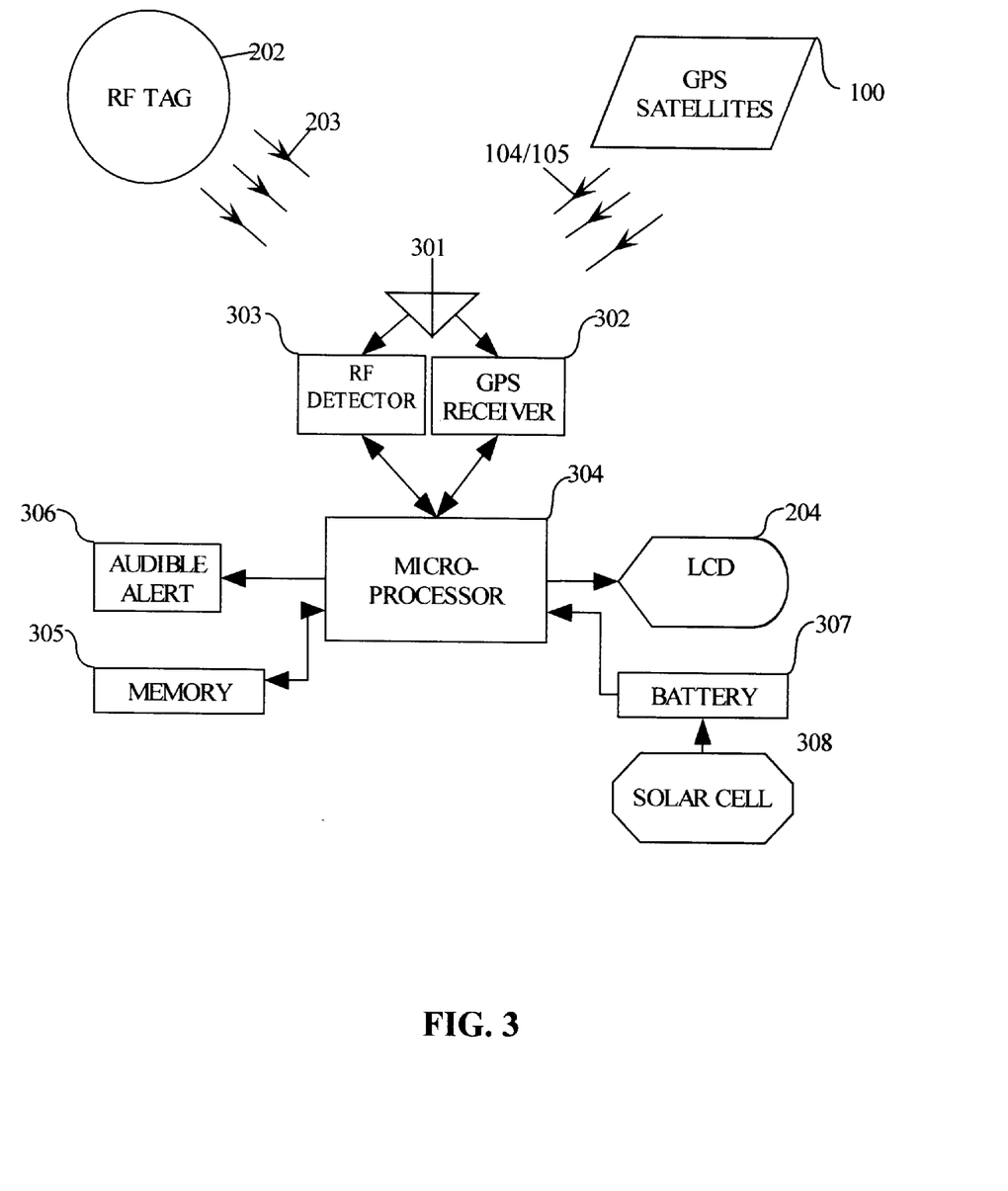
FIG. 3 illustrates a block diagram of the basic components of the preferred embodiment of the apparatus.

The present invention utilizes GPS technology by incorporating a GPS receiver (302) into a handheld device (103) having the approximate dimensions of a key chain automobile alarm activator. The GPS receiver (302) automatically retrieves GPS location coordinates (104) prior to the driver (102) leaving the parked vehicle (101) and stores these GPS location coordinates (104) in its memory (305). A beeper alert (306) sounds a single audible beep if the GPS location coordinates (104) for the parked vehicle (101) are successfully retrieved; the apparatus (103) (103) then disengages to conserve battery life. Should the GPS receiver (302) make two failed attempts to retrieve the GPS location coordinates (104) for the parked vehicle (101), a beeper alert (306) sounds several consecutive audible beeps to indicate failure, alerting the driver (102) that he/she should not rely on the Vehicle Locating Apparatus (103) to find his/her parked vehicle (101) on this outing.

The apparatus (103) disengages after the second failure to retrieve GPS location coordinates (104). In the case of a second failure, the driver (102) may manually reengage the retrieval cycle as described above. The driver (102) may make as many attempts to retrieve the GPS location coordinates (104) for the parked vehicle (101) as he/she desires.

Assuming the Vehicle Locating Apparatus (103) successfully retrieves GPS location coordinates (104) for the parked vehicle (101), the driver (102) may use the apparatus (103) to locate the parked vehicle (101) at a later time. When thusly engaged, the apparatus' (103) GPS receiver (302) retrieves GPS location coordinates (105) for the current location of the driver (102). Using formulas well known to those skilled in the art, a microprocessor (304) located within the apparatus (103) determines the shortest course (106) between the driver's (102) most recent GPS location coordinates (105) and the parked vehicle's (101) GPS location coordinates (104) stored in the apparatus' (103) memory (305). The location of the parked vehicle (101) relative to the driver (102) is presented by way of a floating directional arrow (205) on the apparatus' (103) LCD screen (204) as shown in FIG. 2A.

The driver (102) may update the GPS location coordinates (105) of his/her position and thereby the directional arrow (205) as often as is necessary to facilitate return to his/her parked vehicle (101). To conserve battery life, the GPS receiver (302) does not continuously feed "fresh" GPS location coordinates (105) to the directional arrow display (205) unless the driver (102) continuously activates the switch (207).

It should also be noted that one limit of GPS technology is that GPS satellite signals cannot be consistently retrieved in parking garages and in some city areas where tall buildings are particularly dense. In these situations, the Vehicle Locating Apparatus (103) will be less effective. The driver (102) will be alerted by a series of audible beeps when GPS location coordinates (104/105) are not available.

Figure 2:
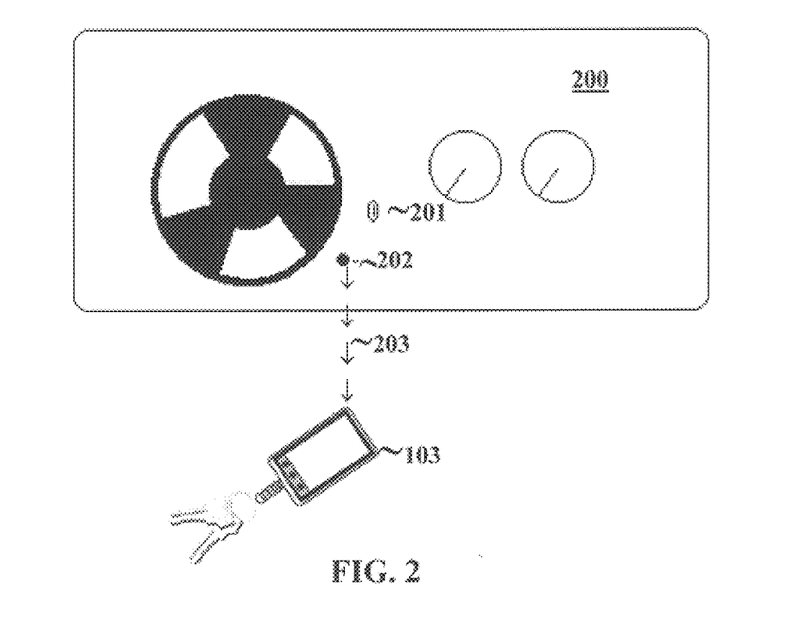
FIG. 2 shows the method whereby the preferred embodiment of the apparatus is automatically engaged prior to being removed from the parked vehicle.
Figure 2A:
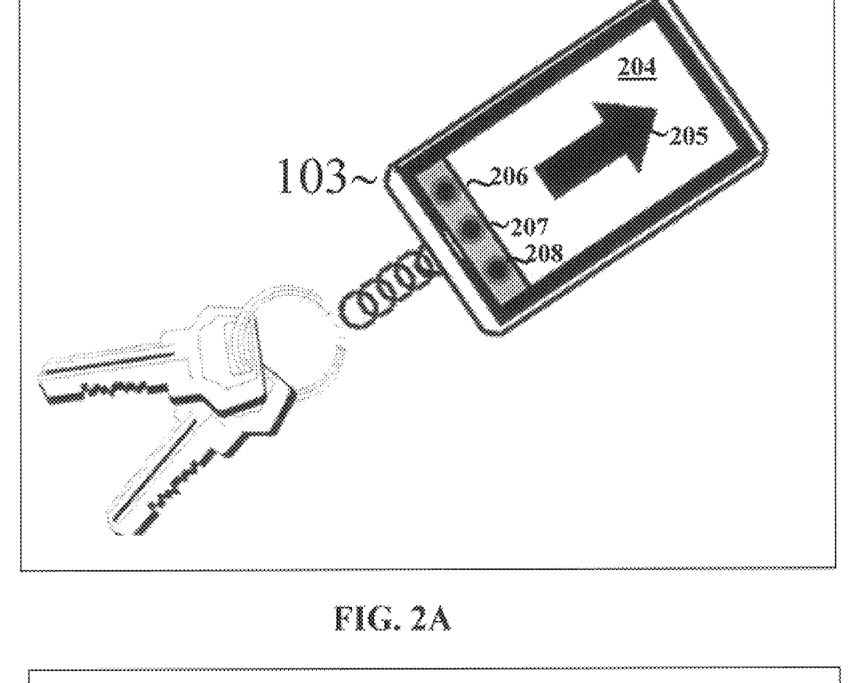
FIG. 2A is an illustration of the preferred embodiment of the apparatus showing a floating directional arrow on an LCD screen.

FIG. 2 illustrates the automatic engagement of the present invention (103) when the vehicle (101) is first parked. It would defeat the purpose of the invention to rely on the driver's (102) memory to engage the Vehicle Locating Apparatus (103) manually prior to exiting the parked vehicle (101) since memory is the issue at hand (forgetting where one's vehicle (101) is parked).

The objective, then, is to automatically engage the apparatus' (103) GPS receiver (302) to retrieve and process the GPS location coordinates (104) of the vehicle (101) when first parked. Accordingly, there are several possible solutions to trigger the apparatus (103). The most practical and least expensive alternative is to use a "tag", a device commonly used in monitoring the movement of objects. A Radio Frequency (RF) tag (202), as presented in this preferred embodiment, contains a radio transmitter that transmits a coded RF signal (203), which is detectable by the apparatus' (103) RF detector (303).

The RF tag (202) is mounted on the dashboard (200) of the vehicle (101) within a specified distance of the ignition (201). The apparatus (103), in its preferred embodiment, hangs from a key chain within close proximity of the RF tag (202) when the vehicle (101) is operational. When the RF detector (303) and, subsequently, the microprocessor (304) first detect the presence of the RF tag's (202) coded RF signal (203), as when the driver (102) inserts the ignition key into the ignition (201), the microprocessor (304) resets the apparatus' (103) automatic engagement protocol 401. More specifically, when the apparatus (103) is removed from the ignition area, as when the driver (102) removes the key and key chain from the ignition (201), the microprocessor (304) recognizes the loss of the RF tag's (202) coded RF signal (203), and according to a predetermined minimum signal threshold embedded in the microprocessor (304) triggers the apparatus (103) to retrieve GPS location coordinates (104) as described in more detail in FIG. 3.

Both the RF tag (202) and the handheld Vehicle Locating Apparatus (103) are battery powered. An alternative embodiment uses a battery-less tag employing magnetic induction where power for the tag's circuitry is obtained by rectification of the apparatus' (103) interrogating signal received by an antenna coil contained within the tag. To accomplish a battery-less tag system would require special circuitry within the tag and apparatus (103) as well as the addition of a transceiver to the handheld apparatus (103). This embodiment is not thought to be preferred due to perceived additional cost of manufacture and the diminished life of the battery (307) contained within the handheld unit (103). It is to be understood that there are many alternative methods for triggering the automatic engagement protocol, including but not limited to motion detection, "broken beam" infrared systems, and Electronic Asset Surveillance systems or components thereof. Accordingly, this invention is not to be deemed as limited to the disclosed embodiments, but by the appended claims made herein.

Figure 2B:
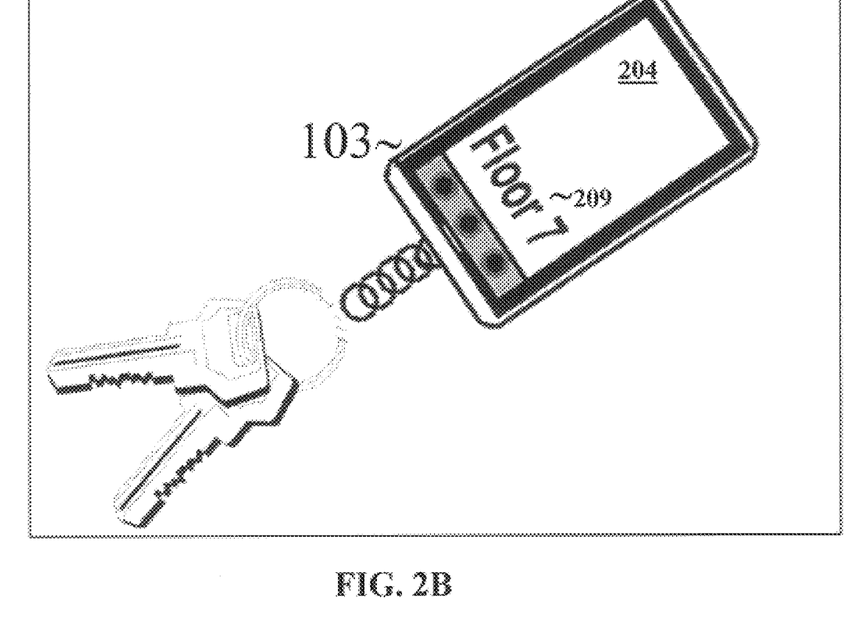
FIG. 2B is an illustration of the preferred embodiment of the apparatus showing the parking garage floor reminder on an LCD screen.

FIG. 2A illustrates the apparatus (103) in its preferred embodiment after successful engagement by the driver (102) for purposes of finding his/her parked vehicle (101). The apparatus (103) is equipped with an LCD screen (204) that presents a directional arrow (205) which points in the direction of the driver's (102) parked vehicle (101). The directional arrow (205) rotates ("floats") around a midpoint thereby minimizing the space required to adequately present the direction of the parked vehicle (101). A series of operational buttons 206, 207, 208 work as follows: 206 is the manual switch that engages the apparatus (103) to retrieve GPS location coordinates (104) for the parked vehicle (01) (this is most likely used when the apparatus' (103) automatic system has failed to retrieve sufficient data from GPS satellites); 207 is a toggle switch that either engages or disengages the locator system which results in the presentation of the directional arrow (205) on the LCD screen (204); and, 208 is a manual electronic counting switch, with integers rotating in numerical order from negative five to fifteen, that when depressed once by the driver adds a single integer to the number stored in the apparatus' (103) memory (305) for the purpose of reminding the driver on what floor he/she has parked within a multi-story parking garage. When the driver reaches the corresponding floor number (209) as shown in FIG. 2B, he/she discontinues depressing the switch (208) and after several seconds the LCD screen (204) disengages automatically. At a later time, should the driver need to be reminded of the floor number he/she has parked on, he/she simply depresses the switch (208) and the corresponding floor number (209) is retrieved from memory (305) and presented on the LCD screen (204). The floor number (209) stored in memory (305) remains constant unless changed by the driver. Switch 208 is a toggle switch that when depressed (as when previously off) displays the last integer (209) recorded in memory (305). When switch 208 is depressed (as when previously on), an integer is added to the number displayed (209) as described above. Since rotational counting circuitry is well known to those skilled in the art, no further description will be presented for this addition to the invention.

Figure 4:
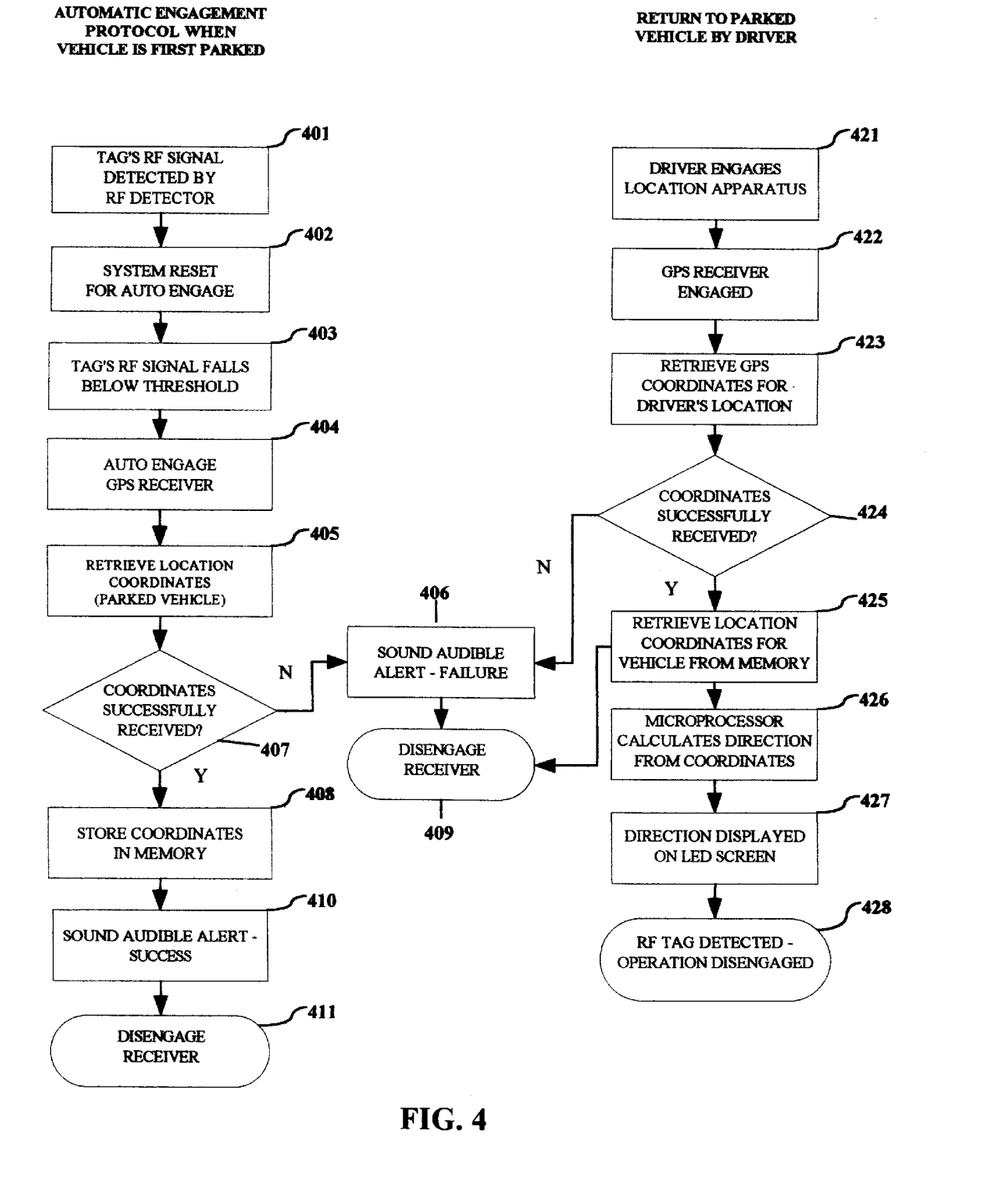
FIG. 4 illustrates by flowchart the operational protocol of the preferred embodiment of the apparatus as it pertains to the disclosures enclosed herein.

FIG. 3 illustrates a block diagram of the basic components used in a preferred embodiment of the Vehicle Locating Apparatus (103). An RF tag (202) produces a coded RF signal (203) by way of an RF transmitter contained within the RF tag (202). When the RF tag's (202) coded RF signal (203) is received by an RF antenna (301) contained within the apparatus (103), the coded RF signal (203) is routed through a frequency isolating RF filter, amplified by an RF amplifier and fed to the RF detector (303) (for purposes of this illustration the RF detector block includes the filter and amplifier components). The RF detector (303) then extracts the RF tag's (202) coded RF signal (203) and passes it to the microprocessor (304). At such time, the microprocessor (304) engages a predetermined minimum RF signal threshold embedded within its circuitry as is well known to those skilled in the art. When the RF tag's (202) coded RF signal (203) falls below the threshold, as when the driver (102) removes the ignition key (along with the key chain attached apparatus (103)) from the ignition (201) area, the apparatus' (103) GPS receiver (302) is automatically engaged by the microprocessor (304) to retrieve from GPS satellites (100) the GPS location coordinates (104) for the parked vehicle (101). These GPS location coordinates (104) are then stored in the apparatus' (103) memory (305). The microprocessor (304) determines whether GPS location coordinates (104) for the parked vehicle (101) are successfully retrieved and sounds an alert (306) as previously described. Through its internal logic circuitry, as is well known to those skilled in the art, the microprocessor (304) then considers the number and duration of processes, either completed or failed, and discontinues control signals to all unnecessary components including the GPS receiver (302) in accordance with an embedded operational protocol (FIG. 4).

Once the driver (102) manually engages the apparatus (103) for the purpose of finding his/her parked vehicle (101), the GPS receiver (302) retrieves GPS location coordinates (105) for the driver's (102) current location. Using the GPS location coordinates (105) for the driver's (102) current location and the GPS location coordinates (104) for the driver's (102) parked vehicle (101) as retrieved from memory (305), the microprocessor (304) calculates a straight course (106) between the driver (102) and his/her parked vehicle (101). This course (106) is then converted into a graphically displayable format by the microprocessor (304) and is presented on an LCD screen (204) in the form of a floating directional arrow (205).

Upon reaching the parked vehicle (101) and reinserting the key into the ignition (201), the RF detector (303) again detects the presence of the RF tag's (202) coded RF signal (203) and, thus, the microprocessor (304) discontinues control signals to all unnecessary components including the LCD screen (204). More specifically, embedded within the microprocessor's (304) circuitry is an operational protocol (FIG. 4), as is well known to those skilled in the art, such that the microprocessor (304) discontinues control signals to all unnecessary components when the RF tag's (202) coded RF signal (203) is detected after the completed operation cycle (e.g., the operation cycle is deemed to be complete when either the driver (102) finds his/her parked vehicle (101) and brings the apparatus (103) within proximity of the RF tag (202), the toggle switch (207) is depressed at any time during the operational cycle, or a predetermined time period has elapsed with no input from the driver (102)).

The handheld apparatus' (103) battery (307) is rechargeable by a solar cell (308).

It is to be understood that FIG. 3 illustrates just one of many possible electronic embodiments of the apparatus (103), and that numerous variations are possible without departing from the scope of the present invention.

FIG. 4 represents a flowchart of the Vehicle Locating Apparatus' (103) operational protocol. The left hand side of the flowchart describes the automatic engagement for the GPS receiver at the time the vehicle is first parked, beginning with the RF tag's coded RF signal being detected by the apparatus when it first comes into proximity with the dashboard-mounted RF tag (401). When the apparatus first detects the RF tag's coded RF signal, the microprocessor within the apparatus resets a minimum threshold with regard to the RF tag's coded RF signal (402). When the RF tag's coded RF signal falls below the predetermined threshold (403), the apparatus' GPS receiver automatically engages (404) to retrieve GPS location coordinates for the parked vehicle (405). The microprocessor determines whether sufficient GPS data has been retrieved to accurately determine the location of the parked vehicle (407). If sufficient data are not retrieved after two attempts, several consecutive audible beeps alert the driver that the location process has been unsuccessful (406) and the GPS receiver disengages automatically to conserve battery life (409). If sufficient data are retrieved, the microprocessor stores the GPS location coordinates for the parked vehicle in memory (408). At this time, a short audible beep alerts the driver that the location process has been successfully completed 410 and the GPS receiver disengages automatically (411).

The right hand side of FIG. 4 illustrates the operational protocol for the return of the driver to his/her parked vehicle, beginning with the manual engagement of the apparatus by the driver for its intended purpose (421/422). Once the apparatus is engaged, the GPS receiver retrieves GPS location coordinates for the driver's current location (423). The microprocessor determines whether or not sufficient data has been collected to accurately determine the driver's current location (424). If sufficient data are not retrieved after two attempts, several consecutive audible beeps alert the driver that the location process has been unsuccessful (406) and the GPS receiver disengages automatically to conserve battery life (409). If sufficient data are retrieved to determine the driver's current location, the microprocessor, using formulas well known to those skilled in the art, calculates a straight course between the driver's current location coordinates and those for the parked vehicle previously stored in memory (425/426). This course is then converted into a graphically displayable format that is presented on an LCD screen as a "floating" arrow, pointing in the direction of travel between the driver and his/her parked vehicle (427). Once the apparatus' RF detector senses the RF tag's coded RF signal, as when the driver returns to the parked vehicle and inserts the key in the ignition, all unnecessary components automatically disengage to conserve battery life (428). At this stage the apparatus is once again awaiting the RF tag's coded signal to fall below the predetermined threshold (401).

Figure 5:
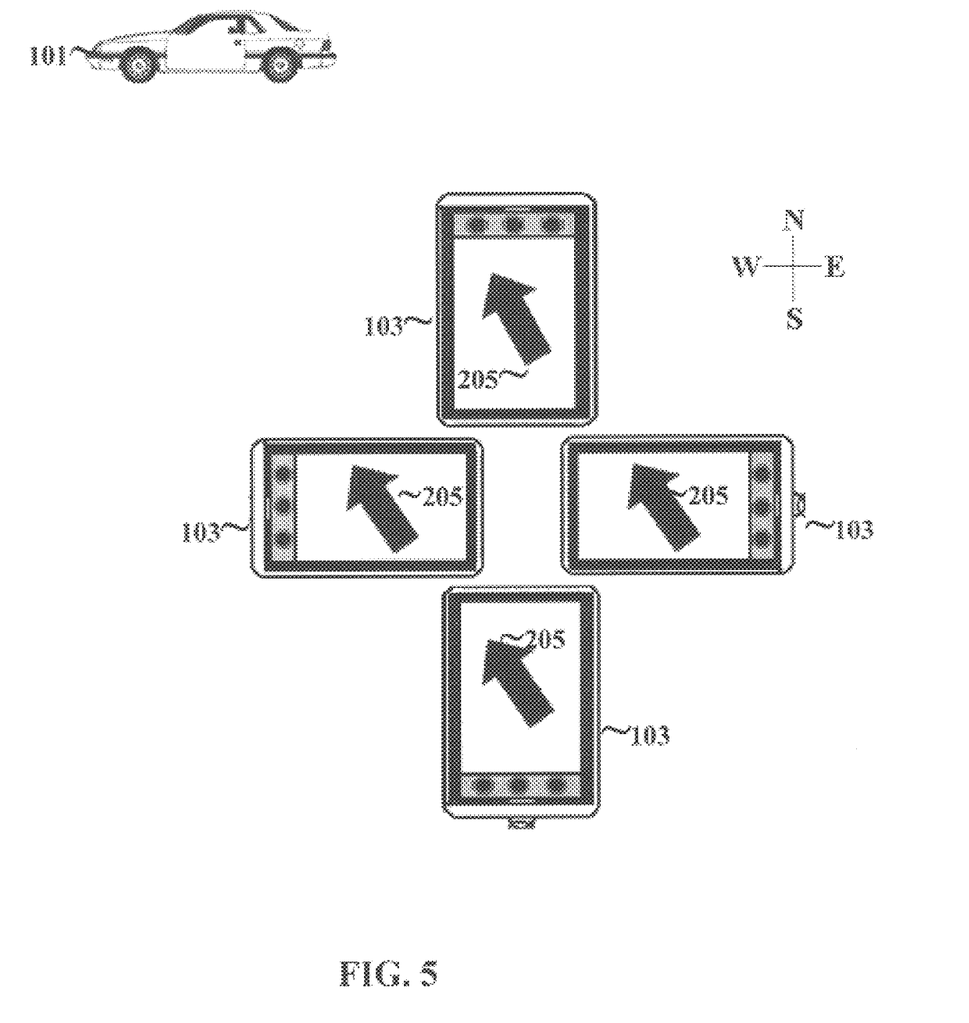
FIG. 5 shows how the directional arrow of the graphic display remains fixed with regard to the parked vehicle relative to a compass despite the orientation of the apparatus relative to a compass.

The apparatus (103), as shown in FIG. 5, contains an internal compass so that the directional arrow (205) can maintain its directional integrity when first activated by the driver (102). FIG. 5 shows the apparatus (103) facing in four different directions when first engaged. As is illustrated, the directional arrow (205) faces the parked vehicle (101) regardless of the orientation of the apparatus (103) relative to a compass. In other words, if the driver (102) is facing in the absolute opposite direction of his/her parked vehicle (101) when the apparatus (103) is first engaged, the directional arrow (205) will appear on the LCD screen (204) with the point of the arrow (205) facing in toward the driver's (102) stomach, indicating that the parked vehicle (101) is directly behind the driver (102). As the driver (102) pivots to face the direction of his/her parked vehicle (101), as indicated by the directional arrow (205), the microprocessor (304) adjusts the directional arrow (205) relative to the internal compass' fixed point of reference so that the arrow (205) is always pointing toward the driver's (102) parked vehicle (101). It should be noted that once the driver (102) begins traveling toward his/her parked vehicle (101), the absolute integrity of the directional arrow (205) can only be maintained by activating the locator switch (207) whereby the microprocessor (304) is fed "fresh" GPS location coordinates (105) for the driver's (102) changing position. In most situations, however, the driver (102) will only need to be pointed in the direction of his/her parked vehicle (101), once, in order to find his/her vehicle (101).

Accordingly, the reader will see that the Vehicle Locating Apparatus can be successfully used by a driver to find the forgotten location of his/her parked vehicle when his/her vehicle has been parked in an unfamiliar area, in a crowded parking lot, or in a multi-story parking garage.

Although the description above contains many specificities, these should not be construed as limiting the scope of the invention but as merely providing illustrations of some of the presently preferred embodiments of this invention. For example, the visual display can be an LED display, a physical arrow as in a compass, or replaced entirely by an audio or light display whereby the direction of the parked vehicle is presented as an increase in the intensity of the light or sound; the shape of the apparatus can be round instead of rectangular; letters can be added to the floor finder to increase usability, etc.

Thus the scope of the invention should be determined by the appended claims and their legal equivalents, rather than by the examples given.

I claim:

1. An apparatus comprising means of determining, from certain satellite signals retrieved automatically, the location of a driver's parked vehicle, and then graphically presenting on a handheld visual display the direction to said parked vehicle relative to the driver's current location, said apparatus comprising not more than one satellite signal receiver.

2. The apparatus of claim 1 wherein said apparatus is handheld and small in size.

3. The apparatus of claim 1 wherein a satellite signal receiver is mounted in said apparatus.

4. The apparatus of claim 1 wherein said apparatus comprises means of automatically engaging said satellite signal receiver to retrieve certain satellite signals that can be converted into location coordinates for said parked vehicle prior to said driver exiting said parked vehicle and with no prompting from said driver.

5. The apparatus of claim 4, wherein the means of automatically engaging further comprises a transmit said transmitter's signal is detected by means comprised within said apparatus whereby the loss of said transmitter's signal automatically engages said satellite receiver.

6. The apparatus of claim 5, wherein the means of automatically engaging further comprises a signal detector.

7. The apparatus of claim 5, wherein the means of automatically engaging further comprises a microprocessor.

8. The apparatus of claim 5 wherein said signal detector detects said transmitter's signal and feeds a transmitter's signal to said microprocessor, said microprocessor automatically engages otherwise, the means of automatically engaging comprises a microprocessor, which then comprises the means of automatically engaging said satellite signal receiver when said transmitter's signal falls below a predetermined minimum threshold.

9. The apparatus of claim 8 wherein an operational protocol is embedded within said microprocessor, said operational protocol containing said predetermined minimum threshold for said transmitter's signal and procedural instructions detailing the actions of said microprocessor with regard to controlling the interactions of said apparatus' various components, including automatically engaging said satellite signal receiver when said transmitter's signal falls below said predetermined minimum threshold.

10. The apparatus of claim 1 wherein said apparatus comprises means of converting certain satellite signals retrieved by said satellite signal receiver into satellite derived location coordinates and for recording the satellite derived location coordinates relating to the location of said parked vehicle.

11. The apparatus of claim 10, wherein the means of converting further comprises a microprocessor which converts said certain satellite signals into satellite derived location coordinates.

12. The apparatus of claim 10, wherein the means of converting further comprises a memory.

13. The apparatus of claim 1 wherein said apparatus comprises means of alerting said driver as to whether or not said apparatus successfully retrieved said satellite derived location coordinates for said parked vehicle.

14. The apparatus of claim 13, wherein the means of alerting comprises beeper alert, said beeper alert sounding either a single audible beep if a microprocessor determines that said satellite derived location coordinates were sufficient to accurately establish the location of said parked vehicle or a series of audible beeps if said microprocessor determines that said apparatus has failed in two consecutive attempts to establish said satellite derived location coordinates of said parked vehicle.

15. The apparatus of claim 1 wherein said apparatus comprises a means of disengaging the satellite signal receiver after the successful retrieval, conversion of, and storage in a memory of said satellite derived location coordinates for said parked vehicle or two consecutive failures to obtain said satellite derived location coordinates for said parked vehicle.

16. The apparatus of claim 15, wherein the means of disengaging comprises a microprocessor which discontinues the control signal activating said satellite signal receiver in accordance with said operational protocol embedded within said microprocessor.

17. The apparatus of claim 1 wherein said apparatus comprises means of presenting to said driver the direction of said parked vehicle relative to said driver's current location.

18. The apparatus of claim 17, where the means of presenting comprises said satellite signal receiver retrieves certain satellite signals and a microprocessor converts said certain satellite signals into satellite derived location coordinates for said driver's current location.

19. The apparatus of claim 17 wherein said microprocessor uses the satellite derived location coordinates for said parked vehicle stored in a memory and the satellite derived location coordinates for said driver's current location to calculate a straight course between said driver's current location and said parked vehicle's location.

20. The apparatus of claim 17, where the means of presenting further comprises a visual display.

21. The apparatus of claim 17 wherein said straight course is converted into a graphically displayable format by said microprocessor, and is presented as a directional arrow rotating around a midpoint on said visual display.

22. The apparatus of claim 1 wherein said apparatus comprises means of alerting said driver as to the failure of said apparatus to successfully obtain said satellite derived location coordinates for said driver's current location.

23. The apparatus of claim 22, where the means of alerting comprises a beeper alert which sounds a series of audible beeps when said microprocessor determines that two consecutive attempts have failed to retrieve sufficient certain satellite signals to derive said driver's current location.

24. The apparatus of claim 1 wherein said apparatus contains means of disengaging said satellite signal receiver and said visual display at such time as they are no longer needed by said driver to locate said parked vehicle.

25. The apparatus of claim 24, wherein the means of disengaging comprises a microprocessor which discontinues control signals activating said satellite signal receiver and said visual display in accordance with an operational protocol embedded within said microprocessor.

26. A method of recording, within the apparatus of claim 1, numerals and letters that refer to either the floor number on which a driver has parked a vehicle within a multi-story parking garage or a location code for said parked vehicle within said parking garage.

27. The method of claim 26 comprises the step of incorporating into said apparatus a switch or switches that, when manually depressed by the driver, increase the number or letter stored in said apparatus' memory by one integer or letter, as the case may be, until the number or letter stored in said memory corresponds to said floor number or said location code, said floor number or said location code being available for later presentation on said visual display.

28. The method of claim 26 comprises the further step of utilizing circuitry which allows cyclical rotation, in numerical order, of said number stored in said memory, from negative five to positive fifteen, such that negative five follows positive fifteen in the continuous rotational order whereby underground parking is designated by negative numbers.

29. The method of claim 26 comprises the further step of utilizing circuitry which allows for the cyclical rotation, in alphabetical order, of said letter stored in said memory such that A follows Z in the continuous rotational order.

* * * * *